United States Patent
Raymond

[15] 3,645,359
[45] Feb. 29, 1972

[54] APPARATUS FOR AUTOMATICALLY MAINTAINING THE ANGULAR POSITION OF AN AERIAL PLATFORM USED IN CONJUNCTION WITH A BOOM

[72] Inventor: James W. Raymond, Duluth, Minn.
[73] Assignee: Reach-all Manufacturing Co., Duluth, Minn.
[22] Filed: Aug. 13, 1970
[21] Appl. No.: 63,570

[52] U.S. Cl. ..................................................... 182/2
[51] Int. Cl. ......................................................... B66f 11/04
[58] Field of Search ........................................ 182/2; 254/93

[56] References Cited

UNITED STATES PATENTS 2,606,078  8/1952  Brock ........................................ 182/2
2,616,768  11/1952  Stemm ....................................... 182/2

Primary Examiner—Reinaldo P. Machado
Attorney—Wicks and Nemer

[57] ABSTRACT

Hydraulic apparatus for maintaining the angular position of an operator basket on the end of a three-section articulated boom is disclosed. A double acting hydraulic cylinder and rack and pinion are associated with each pivot point on the boom, including the pivot point between the operator basket and the end of the boom, such that rotational movement of any or all joints in the boom causes a corresponding movement of hydraulic fluid at all joints. The double-acting cylinders are interconnected, major area to major area and minor area to minor area, such that a net rotation of the boom sections about the joints of the boom provides a net amount of hydraulic fluid to the cylinder associated with the basket to thus rotate the basket according to the net amount of rotation of the boom sections to thus maintain the angular position of the basket with respect to a fixed reference.

10 Claims, 3 Drawing Figures

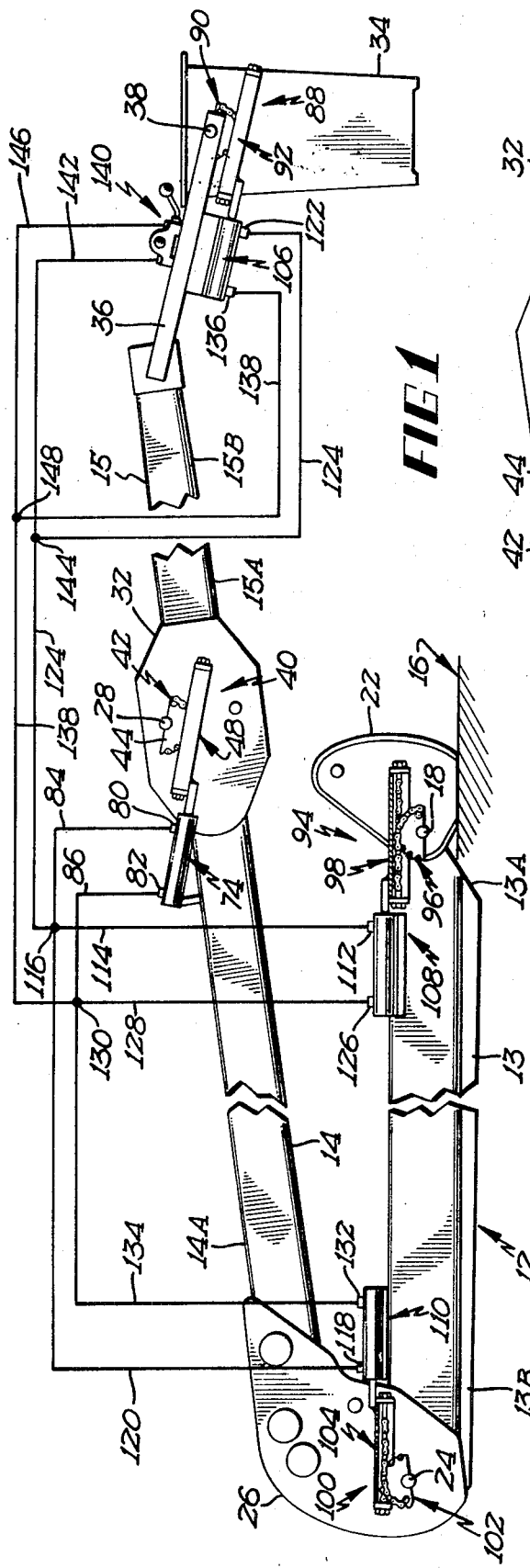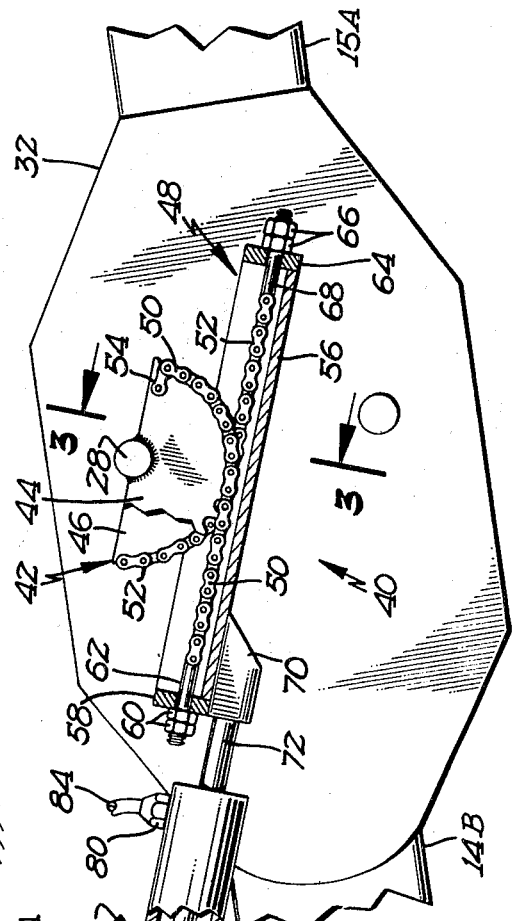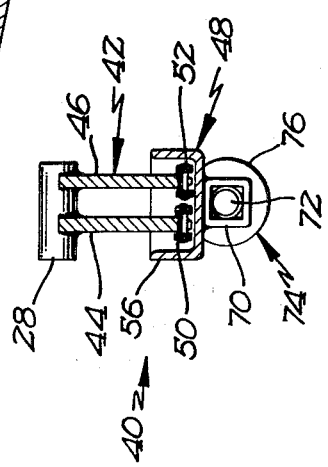

3,645,359

APPARATUS FOR AUTOMATICALLY MAINTAINING THE ANGULAR POSITION OF AN AERIAL PLATFORM USED IN CONJUNCTION WITH A BOOM

BACKGROUND

The present invention generally relates to aerial platforms used with booms, more specifically relates to apparatus for maintaining the position of an aerial platform used with a boom, and still more particularly relates to apparatus for automatically maintaining the position of an aerial platform used with a boom.

In using an articulated boom having several sections, an operator may be positioned in a basket at the end of the boom where he may control and position the articulated boom sections such that he may position himself adjacent the work to be done.

However, since the basket is attached to the end of the boom, movement of the various boom sections, and particularly changes in their angular rotation with respect to a fixed reference, for example, the ground, will necessarily result in a change in the angular position of the operator basket with respect to the ground. Since the operator is accustomed to a relatively fixed angular position with respect to the ground, angular rotation of the operator basket is unpleasant to the operator and can be dangerous if the angle is changed severely enough to cause the operator to fall from the basket.

Therefore, the operator must have some means of changing the angular position of his basket when the boom section is moved. Without more, however, the operator would then be required to simultaneously position the operator basket in addition to the boom sections, and this requires added concentration and dexterity on the part of the operator.

SUMMARY

The present invention solves these and other problems in the control of aerial platforms used with booms by providing apparatus for automatically maintaining the angular position of an aerial platform upon movement of the boom.

Briefly, a preferred embodiment of the present invention includes a plurality of double-acting hydraulic cylinders connected to rack and pinion arrangement so that each rack-and-pinion arrangement converts the rotational movement of the boom sections to linear motion of the hydraulic piston. Hydraulic fluid connections are then arranged to interconnect each double-acting hydraulic cylinder so that: rotation of any joint forces fluid from the associated cylinder; the excess hydraulic fluid is forced into the cylinder associated with the operator basket; and the cylinder associated with the operator basket rotates that basket an amount proportional to the net rotation of all joints in the boom. Therefore, the angular position of the operator basket with respect to a fixed reference may be automatically maintained without the necessity of control by the operator, and the operator may concentrate his full attention to the manipulation of the booms.

A further feature of the present invention is the use of rack-and-pinion arrangements which allow a positive mechanical movement with a minimum of slippage.

Thus, it is an object of the present invention to provide novel apparatus for maintaining the angular position of an aerial platform used in conjunction with a boom.

It is a further object of the present invention to provide novel aerial platform angular position maintaining apparatus which automatically adjusts for boom movement.

It is a further object of the present invention to provide aerial platform angular position maintaining apparatus which hydraulically automatically adjusts for boom movement.

It is a still further object of the present invention to provide aerial platform angular position maintaining apparatus which automatically adjusts in a mechanically positive fashion.

These and further objects and advantages of the present invention will become clearer in light of the following detailed description of an illustrative embodiment of this invention described in connection with the drawings.

DESCRIPTION OF THE DRAWINGS

FIG. 1 shows a schematic representation of a boom and hydraulic system according to the preferred embodiment of the present invention arranged for levelling an operator basket attached to one end of the boom.

FIG. 2 shows an enlarged view of a portion of the apparatus of FIG. 1 with parts thereof shown in section and other parts broken away.

FIG. 3 shows a sectional view of a portion of the apparatus of FIG. 2 along section line 3—3.

Where used in the various figures of the drawings, the same numerals designate the same or similar parts. Furthermore, when the terms "left," "right," "top," "bottom," "clockwise,' ' and "counterclockwise" are used herein, it should be understood that these terms have reference only to the structure shown in the drawings as it would appear to a person viewing the drawing and are utilized only to facilitate describing the invention.

DESCRIPTION

In FIG. 1, an articulated boom system generally designated 10 is shown including a boom arm generally designated 12 which boom arm 12, in turn, includes three boom sections 13, 14, and 15. Boom section 13 is shown having a first end 13A conventionally pivotally arranged with respect to a fixed reference, generally designated 16, which reference may be the bed of a truck, ground, or other reference, by means of conventional pivot pin 18 and a first knuckle 22. The second end 13B of boom section 13 is conventionally pivotally connected with the first end 14A of boom section 14 through pivot pin 24 and knuckle 26. The second end 14B of boom section 14, in turn, is conventionally pivotally connected with the first end 15A of boom section 15 through pivot pin 28 and knuckle 32. Lastly, the second end 15B of boom section 15 is conventionally pivotally connected to an aerial platform in this case an operator basket 34, through a connecting member 36 which has a first end fixedly connected to the second end 15B of boom section 15 and a second end conventionally pivotally connected to operator basket 34 through a pivot pin 38.

The exact mechanism of a three-section articulated boom having an aerial platform in the form of an operator basket is well known to those skilled in the boom art, and therefore no further description thereof is necessary. The remaining portions of the drawings relate to the novel aerial platform angular positioning control of the present invention.

In FIGS. 2 and 3, enlarged views of knuckle 32 and its associated apparatus are shown, partially in section. In particular, a rack-and-pinion assembly generally designated 40 is shown with a pinion portion, designated 42, formed of two semicircular spur gears 44 and 46 secured to pivot pin 28 by welding and arranged in parallel relation, as best seen in FIG. 3. Pivot pin 28 is immovably attached to boom section 15 for reasons hereinafter explained.

Rack-and-pinion assembly 40 further includes a rack portion, designated 48, formed of two roller chains 50 and 52 arranged as follows. Roller chain 50 has a first end attached to the circumference of gear 44 near the semicircular diameter by means of a link 54 and extends downward along the circular circumference of gear 44 to the bottom of the gear. From the bottom of gear 44, chain 50 extends leftward within a metal channellike structure 56 and through a channel end wall 58 (both shown in section in FIG. 2) where two nuts 60 are threaded onto a threaded shaft 62 conventionally attached to the second end of roller chain 50 to firmly hold the individual rollers of roller chain 50 upon the teeth of gear 44. Similarly, a first end of roller chain 52 is attached to gear 46 by a link, not shown, extends along the circular circumference of gear 46 until the bottom of gear 46 is reached, then roller chain 52 extends rightward within the channellike structure 56 and through a second channel end wall 64 where nuts 66 are threaded onto a threaded shaft 68 conventionally attached to the second end of roller chain 52 to firmly hold the individual rollers of roller chain 52 upon the teeth of gear 46.

A hollow square metal channel 70 is welded to the bottom of channel 56 and arranged to receive the end of a piston shaft 72 of a double acting hydraulic cylinder generally designated 74. Hydraulic cylinder 74 includes a cylinder body 76 attached to boom section 14 and conventionally housing a hydraulic piston 78. Piston shaft 72 attaches piston 78 to rack portion 48 of rack and pinion assembly 40.

Further, hydraulic cylinder 74 includes first and second fluid ports 80 and 82, respectively, for connecting to hydraulic fluid conductors 84 and 86, respectively, as is best shown in FIG. 1. As is well known in the art, fluid flow into the first fluid port 80 and linear motion of piston 78 leftward are directly proportional. That is, the linear distance that piston 78 travels leftward is directly proportional to the amount or volume of hydraulic fluid forced into port 80. The exact amount of leftward movement of piston 78 is dependent upon the displacement ratio of piston 78 to the right of piston 78 within cylinder body 76, the minor area which communicates with fluid port 80. Similarly, fluid flow into the second fluid port 82 and the linear motion of hydraulic piston 78 rightward are directly proportional. Again, the exact amount of movement is dependent upon the displacement ratio of piston 78 to the left of piston 78 within cylinder body 76, the major area which communicates with second fluid input 82.

Similarly, rack-and-pinion assemblies are arranged about each other knuckle or pivot point in the boom system 10. In particular, rack-and-pinion assembly 88 is arranged about pivot pin 38, which is immovably attached to operator basket 34. Rack-and-pinion assembly 88 includes a pinion portion 90 and a rack portion 92 similar in construction and arrangement to pinion portion 42 and rack portion 48 of rack-and-pinion assembly 40 shown in detail in FIGS. 2 and 3. Further, rack-and-pinion assembly 94 is arranged about pivot pin 18, which is immovably attached to knuckle 22, to include a pinion portion 96 and a rack portion 98. And rack-and-pinion assembly 100 is arranged about pivot pin 24, which is immovably attached to knuckle 26 and thus boom are 14, to include a pinion portion 102 and a rack portion 104. Again, rack-and-pinion assemblies 94 and 100 are similar in construction and arrangement to the rack-and-pinion assembly 40 shown in detail in FIGS. 2 and 3.

Further, double-acting hydraulic cylinders, similar or identical to the double-acting hydraulic cylinder 74 described in conjunction with rack-and-pinion assembly 40, are arranged about each knuckle or pivot point and its associated rack-and-pinion assembly within boom section 10. In particular, a hydraulic cylinder 106 is attached to connecting member 36 to cooperate with rack and pinion assembly 88, a hydraulic cylinder 108 is attached to boom section 13 to cooperate with rack-and-pinion assembly 94, and a hydraulic cylinder 110 is attached to boom section 13 to cooperate with rack-and-pinion assembly 100. Each double-acting hydraulic cylinder cooperates with its associated rack-and-pinion assembly in the manner described with respect to hydraulic cylinder 74 and rack-and-pinion assembly 40 of FIGS. 2 and 3.

Each cylinder is further arranged to cooperate as a group through a plurality of hydraulic fluid conduits. In particular conduit 84 connected to first port 80 of hydraulic cylinder 74 is further connected to: first fluid port 112 of cylinder 108 through a conduit 114 joining conduit 84 at junction point 116; first fluid port 118 of hydraulic cylinder 110 through a conduit 120 joining conduit 84 also at junction point 116; and first fluid port 122 of hydraulic cylinder 106 through a conduit 124 again joining conduit 86 at junction point 116. Also, conduit 86 connected to the second fluid port 82 of hydraulic cylinder 74 is further connected to: a second fluid port 126 of cylinder 108 through a conduit 128 joining conduit 86 at junction point 130; a second fluid port 132 of cylinder 110 through a conduit 134 further joining conduit 86 at junction point 130; a second fluid port 136 of hydraulic cylinder 106 by means of conduit 138 again joining conduit 86 at junction point 130.

Also a conventional four-way hydraulic control valve 140 is connected to the first ports of the cylinders through a conduit 142 connected with conduit 124 at junction point 144 and is connected to the second ports of the cylinders through a conduit 146 which interconnects with conduit 138 at junction point 148. Control valve 140 allows the operator to override the automatic operator basket position maintaining system of the present invention.

OPERATION

In using the apparatus of the present invention, a boom operator controls the boom-positioning hydraulic cylinders, not shown, in order to manipulate the various boom sections to position himself adjacent work to be done, and the operator basket 34 is automatically maintained at whatever fixed angular position with respect to ground 16 that existed upon the initiation of the boom section movements. The automatic maintenance of the fixed angular position results from the interconnection of all the hydraulic cylinders and from the connection of each individual hydraulic cylinder and its associated rack-and-pinion assembly.

As an example of the operation of the present invention, assume a boom operator only changes the position of boom section 15 with respect to boom section 14, and boom section 15 is rotated clockwise from the position shown in FIG. 1. Without more, a clockwise rotation of boom section 15 would rotate operator basket 34 such that a counterclockwise rotation of operator basket 34 is needed to again put it in the angular position it had before the manipulation of boom section 15, level with the ground 16. In this situation, since pivot pin 28 is immovably attached to boom section 15, pivot pin 28 also rotates clockwise. The clockwise rotation of pivot pin 28 causes: the proportioned clockwise rotation of gears 44 and 46 forming pinion portion 42 of rack-and-pinion 40; the corresponding clockwise movement of roller chain 52 around the circumference of gear 46; the leftward linear motion of channel end 64 and thus channel 56, caused by the pulling of roller chain 52, in an amount proportional to the angular rotation of pinion portion 42; the corresponding leftward linear motion of piston shaft 72; the corresponding leftward linear motion of piston 78; the forced exit of a proportional amount of hydraulic fluid from fluid port 82 into conduit 86 due to the reduced volume within the major area of hydraulic cylinder 76, leftward of piston 78. Since it was assumed that no other joint moved and since the hydraulic joint control for positioning the boom section much overpowers the hydraulic cylinders disclosed herein, the forced exit of hydraulic fluid from port 82 into fluid conduit 86 causes: the forced entry of hydraulic fluid only into the second fluid port 136 of hydraulic cylinder 106 through conduit 138 connected to conduit 86 by junction point 130; the corresponding rightward linear movement of the hydraulic piston within cylinder 106 due to the increased pressure leftward of this piston; the corresponding rightward linear movement of the rack portion 92 of rack-and-pinion 88; the corresponding counterclockwise angular rotation of pinion portion 90; and the corresponding counterclockwise angular rotation of operator basket 34 through the immovably attached pivot pin 38 to thus balance the assumed clockwise rotation of boom section 15 with a counterclockwise rotation of operator basket 34.

The angular rotation of operator basket 34 is substantially equal to the assumed angular rotation of boom section 15 with respect to boom section 14 since corresponding movements of the hydraulic pistons of hydraulic cylinders 74 and 106 cause a displacement of corresponding amounts of hydraulic fluid, i.e., the corresponding displacement ratios are equal and the cylinders are connected major area to major area and minor area to minor area. Therefore, the absolute angular rotation of boom section 15 is converted by hydraulic cylinder 74 to a fixed amount of hydraulic fluid which is forced into hydraulic cylinder 106 and reconverted to an equal amount of absolute angular rotation.

Notice that the hydraulic fluid forced from the minor area of cylinder 106 through port 122 by the rightward movement of the piston within cylinder 106 in correcting the angular rotation of operator basket 34 flows through conduit 138, junction point 116, through conduit 84, and to the minor area of hydraulic cylinder 74 through port 80, and into the increasing volume behind the leftward-moving hydraulic piston 78. Thus the system is completely balanced.

If it is assumed that boom section 15 is rotated counterclockwise from the position shown in FIG. 1, and the operator basket 34 is thus counterclockwise displaced from the level position shown in FIG. 1, the counterclockwise rotation of pivot pin 28 causes: the counterclockwise rotation of gears 44 and 46 forming pinion portion 42; the counterclockwise movement of roller chain 50 along the circumference of gear 44; the rightward linear motion of channel end 58 and thus channel 56, caused by the pulling of roller chain 50; the rightward linear motion of piston shaft 72; the rightward linear motion of piston 78; and the forced exit of hydraulic fluid from fluid port 80 into conduit 84 by the decreasing volume of the minor area rightward of piston 78 within hydraulic body 74. Again, since it was assumed no other joint was moved and since the hydraulic control of the boom sections much overpowers the hydraulic cylinders disclosed herein, the forced exit of hydraulic fluid from first port 80 into conduit 84 is forced into cylinder 106 through first port 122 which is interconnected with first port 80 of cylinder 74 by means of conduit 124, junction point 116, and conduit 84. The forced entry of hydraulic fluid into the minor area of cylinder 106 through port 122 causes: the leftward linear motion of the hydraulic piston within cylinder 106; the leftward linear motion of rack portion 92 of rack-and-pinion 88; the corresponding clockwise angular rotation of pinion portion 90; and the corresponding clockwise angular rotation of operator basket 34 through the immovably attached pivot pin 38 to thus balance the assumed counterclockwise rotation imparted to operator basket 34 by the counterclockwise rotation of boom section 15 with respect to boom section 14.

Again, since the displacement ratios of the hydraulic cylinders are equal, the absolute counterclockwise rotation of boom section 15 is converted by hydraulic cylinder 74 into a fixed amount of hydraulic fluid, which fluid is forced into hydraulic cylinder 106, and again converted into an equal amount of clockwise angular rotation for operator basket 34.

Further, notice that again the system is balanced since the excess hydraulic fluid flowing from second port 136 of cylinder 106 is received within second port 82 of cylinder 74.

A similar result obtain for the remaining two knuckles. For example, if it is assumed that the boom operator causes the only movement of the system to be the clockwise rotation of boom section 13 about pivot pin 18 immovably attached to knuckle 22, the operator basket 34 will require a counterclockwise movement to restore its angular position to that shown in FIG. 1. It can now be appreciated that a clockwise rotation of boom section 13 about pivot pin 18 will cause a forced exit of hydraulic fluid from second port 126 of cylinder 108 and thus again provide a forced entry of hydraulic fluid into second port 136 of cylinder 106 associated with operator basket 34 to impart the proper corrective counterclockwise rotation to operator basket 34. Similarly, if it is assumed that the only angular rotation in the system is a clockwise rotation of boom section 14 with respect to boom section 13 about pivot pin 24 which is immovably attached to knuckle 26 and hence boom section 14, operator basket 34 will again require a counterclockwise corrective angular rotation. It will now further be appreciated that a clockwise rotation of boom section 14 will cause a forced exit of hydraulic fluid from second port 132 of cylinder 110 and thus again provide the necessary forced entry of hydraulic fluid into second port 136 of cylinder 106 to impart the corrective counterclockwise rotation of operator basket 34.

In the case of counterclockwise rotations about pivot pin 18 or pivot pin 24, operator basket 34 requires a clockwise angular corrective rotation, and this is achieved in a manner analogous to that explained with respect to counterclockwise rotations about pivot pin 28.

It may now be appreciated that if the boom operator simultaneously causes clockwise or counterclockwise rotations about any or all pivot pins, there will be a net angular rotational effect upon operator basket 34, and there will be a like net flow of hydraulic fluid between cylinders 74, 108, and 110 with any excess flowing to cylinder 106 controlling the rotational attitude of operator basket 34. The net fluid flow between the cylinders will occur in the same manner as explained above with respect to the individual joints, however, only the net resultant angular rotation of the booms and thus the net resultant hydraulic fluid to cylinder 106 will affect the attitude of operator basket 34. Thus, a boom operator may initially position his operator basket to be level, may manipulate the various boom sections according to the work desired, and the apparatus of the present invention will continuously, instantaneously, and automatically maintain the operator basket in a level position without operator intervention, thus leaving the operator free to concentrate his full attention to the manipulation of the booms. If, for some purpose, the operator wishes to change the attitude of his operator basket, he may do so through the use of control valve 140 which can override the automatic system and change the angular position of his operator basket. The automatic system of the present invention will then automatically maintain this newly set position as it maintained the level position previously.

It may now be appreciated that the requirement upon the attachment of the pivot pin of each rotational joint and the mounting of the hydraulic cylinder associated with that joint are related. For example, pivot pin 24 was explained, with respect to the preferred embodiment shown in FIG. 1, to be immovably attached to knuckle 26 and hence boom section 14, but pivot pin 24 may as well be immovably attached to boom section 13 such that boom section 14 and knuckle 26 pivot about pivot pin 24. This arrangement of pivot pin 24 would require the movement of hydraulic cylinder 110 from its mounting upon boom section 13 to a mounting upon boom section 14 to thereby cause the required movement between pinion 102 and rack 104 of rack-and-pinion 100. That is, the attachment of the pivot pin and the location of the associated hydraulic cylinder must be such that angular rotation of the boom arm with respect to the fixed reference causes angular rotation of the pinion with respect to the rack associated with the pivot point to linearly move the rack and the attached hydraulic piston a distance proportional to the rotation of the boom arm with respect to the fixed reference.

Now that the basic teachings of the present invention have been explained, many extension and variations will be obvious to one having ordinary skill in the art. For example, while a three-section boom has been explained, no limitation to this number of boom sections is intended.

Also, while a roller chain rack and pinion has been explained, a geared rack and pinion or other rack and pinion may be used. The roller chain rack and pinion arrangement is preferred, however.

Additionally, aerial platforms other than the operator basket 34 may be used.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. In a boom having a boom arm pivotally arranged with respect to a fixed reference and an aerial platform by pivots, apparatus for automatically maintaining the aerial platform in a fixed angular position with respect to the fixed reference, comprising: at least two double-acting hydraulic cylinders, each including a first fluid port, a second fluid port, a hydraulic piston, and a piston shaft connected to the hydraulic piston, fluid flow into the first fluid port and linear motion of the hydraulic piston and the connected shaft in a first linear direction being proportional, and fluid flow into the second fluid port and linear motion of the hydraulic piston and the connected shaft in a second linear direction being proportional, and the corresponding movements of the hydraulic pistons of the hydraulic cylinders causing a displacement of a corresponding amount of hydraulic fluid; first rack-and pinion means with the first pinion means connected to the pivot of the boom arm adjacent the fixed reference, and with the first rack means attached to the first hydraulic piston of the first hydraulic cylinder by means of the first shaft; means for mounting the first hydraulic cylinder in a manner that angular rotation of the boom arm with respect to the fixed reference causes angular rotation of the first pinion means with respect to the first rack means to linearly move the first rack means and the connected first hydraulic piston a distance proportional to the rotation of the boom arm with respect to the fixed reference; second rack-and-pinion means with the second pinion means connected to the pivot of the boom arm adjacent the aerial platform and with the second rack means attached to the second hydraulic piston of the second hydraulic cylinder by means of the second shaft; means for mounting the second hydraulic cylinder in a manner that linear movement of the second hydraulic piston, the attached piston shaft and second rack means, causes rotational movement of the second pinion means with respect to the second rack means of an angular distance proportional to the linear movement of the second hydraulic piston to rotate the aerial platform an angular distance proportional to the linear movement of the second hydraulic piston; first hydraulic fluid conduit having a first end connected to the first fluid port of the first hydraulic cylinder and having a second end connected to the first hydraulic port of the second hydraulic cylinder to convey hydraulic fluid between the first ports of the first and second hydraulic cylinders; second hydraulic fluid conduit having a first end connected to the second fluid port of the first hydraulic cylinder and having a second end connected to the second hydraulic port of the second hydraulic cylinder to convey hydraulic fluid between the second ports of the first and second hydraulic cylinders whereby angular rotation of boom arm with respect to the fixed reference causes movement of the first rack-and-pinion means, which causes movement of the first hydraulic piston, which causes hydraulic fluid to be transferred between the first hydraulic cylinder and the second cylinder, which causes linear movement of the second hydraulic piston, which causes movement of the second rack-and-pinion means, which causes a change in the angular position of the aerial platform with respect to the fixed reference which change is proportional to the angular positional change of the boom arm with respect to the fixed reference to thereby maintain the angular position of the aerial platform with respect to the fixed reference.

2. The apparatus of claim 1 wherein the boom arm includes at least two sections, the first section having one end pivotally arranged with respect to the fixed reference and a second end pivotally arranged with respect to the first end of the second section by a pivot, and the second section having a second end pivotally arranged with respect to the aerial platform, wherein the apparatus further includes; at least one additional doubld acting hydraulic cylinder including a first fluid port, a second fluid port, a hydraulic piston, and a piston shaft connected to the hydraulic piston, fluid flow into the first fluid port and linear motion of the hydraulic piston and the connecting shaft in the first linear direction being proportional, and fluid flow into the second fluid port and linear motion of the hydraulic piston and the connecting shaft in the second linear direction being proportional, and movements of the third hydraulic piston of the third hydraulic cylinder corresponding to movements of the first and second hydraulic cylinders causing a displacement of a corresponding amount of hydraulic fluid; third rack-and-pinion means with the third pinion means connected to the pivot of the first section and the second section, and with the third rack means attached to the third hydraulic piston of the third hydraulic cylinder by means of the third shaft; means for mounting the third hydraulic cylinder in a manner that angular rotation of the first section with respect to the second section causes angular rotation of the third pinion means with respect to the third rack means to linearly move the third rack means and the connected third hydraulic piston a distance proportional to the rotation of the first section with respect to the second section; third hydraulic fluid conduit having a first end connected to the first fluid port of the third hydraulic cylinder and having a second end fluidically connected to the first hydraulic fluid conduit; fourth hydraulic fluid conduit having a first end connected to the second fluid port of the third hydraulic cylinder and having a second end fluidically connected to the second hydraulic fluid conduit, rotation of any boom section causing a flow of a corresponding amount of hydraulic fluid, any net hydraulic fluid being forced into the second hydraulic cylinder to change the angular position of the aerial platform through the second rack-and-pinion means an amount proportional to the net hydraulic fluid and thus an amount proportional to the net angular rotation of the boom sections.

3. The apparatus of claim 2, wherein at least one rack-and-pinion means comprises gear means and roller chain means.

4. The apparatus of claim 3, wherein the rack-and-pinion means comprises: a channel member having first and second ends, the channel member arranged to receive a piston shaft for connecting the rack-and-pinion means to a hydraulic piston; spur gear means; first roller chain means having a first end fixed to the circumference of the spur gear means and having a second end connected with a first end of the channel member in a manner to maintain the first roller chain means in engagement with the teeth of the spur gear means over at least a portion of the circumference of the spur gear means; second roller chain means having a first end fixed to the circumference of the spur gear means and having a second end connected to the second end of the channel member in a manner to maintain the second roller chain means engagement with the teeth of the spur gear means over at least a portion of the circumference of the spur gear means for causing the first roller chain to pull the channel in a first linear direction upon rotation of the spur gear means in a first angular direction and for causing the second roller chain means to pull the channel in a second linear direction upon the rotation of the spur gear means in a second angular direction for changing the rotational movement of the spur gear means into a linear movement of the channel to thereby cause linear motion of the hydraulic piston upon the rotation of the spur gear means.

5. The apparatus of claim 4, wherein the boom sections are at least partially pivotally arranged with respect to one another by means of a pivot pin, and wherein the spur gear means comprises first and second spur gears immovably attached to the pivot pins in parallel relation, the first roller chain being attached to the first spur gear and the second roller chain being attached to the second spur gear.

6. The apparatus of claim 5, wherein hydraulic controls are positioned adjacent the aerial platform for allowing an operator to manipulate the angular position of the aerial platform with respect to the fixed reference in a manner to override the automatic positioning apparatus.

7. The apparatus of claim 7 wherein at least one rack-and-pinion means comprises gear means and roller chain means.

8. The apparatus of claim 7, wherein the rack-and-pinion means comprises: a channel member having a first and second end, the channel member arranged to receive a piston shaft for connecting the rack-and-pinion means to a hydraulic piston; spur gear means; first roller chain means having a first end fixed to the circumference of the spur gear means and having a second end connected with a first end of the channel member in a manner to maintain the first roller chain means in engagement with the teeth of the spur gear means over at least a portion of the circumference of the spur gear means; second roller chain means having a first end fixed to the circumference of the spur gear means and having a second end connected to the second end of the channel member in a manner to maintain the second roller chain means engagement with the teeth of the spur gear means over at least a portion of the circumference of the spur gear means for causing the first roller chain to pull the channel in a first linear direction upon rotation of the spur gear means in a first angular direction and for causing the second roller chain means to pull the channel in a second linear direction upon the rotation of the spur gear means in a second angular direction for changing the rotational movement of the spur gear means into a linear movement of the channel to thereby cause linear motion of the hydraulic piston upon the rotation of the spur gear means.

9. The apparatus of claim 8, wherein the spur gear means comprises first and second spur gears immovably attached to the pivot pins in parallel relation, the first roller chain being attached to the first spur gear and the second roller chain being attached to the second spur gear.

10. The apparatus of claim 1, wherein hydraulic controls are positioned adjacent the aerial platform for allowing an operator to manipulate the angular position of the aerial platform with respect to the fixed reference in a manner to override the automatic positioning apparatus.

* * * * *